(12) United States Patent
Zhao et al.

(10) Patent No.: US 11,498,808 B2
(45) Date of Patent: Nov. 15, 2022

(54) ELEVATOR BELT AND METHOD OF MANUFACTURE

(71) Applicant: Otis Elevator Company, Farmington, CT (US)

(72) Inventors: Wenping Zhao, Glastonbury, CT (US); John P. Wesson, West Hartford, CT (US); Daniel A. Mosher, Glastonbury, CT (US); Scott Alan Eastman, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 106 days.

(21) Appl. No.: 17/017,231

(22) Filed: Sep. 10, 2020

(65) Prior Publication Data

US 2020/0407195 A1    Dec. 31, 2020

Related U.S. Application Data

(62) Division of application No. 15/119,402, filed as application No. PCT/US2014/016864 on Feb. 18, 2014, now Pat. No. 10,800,637.

(51) Int. Cl.
| | |
|---|---|
| *B66B 7/06* | (2006.01) |
| *D07B 5/04* | (2006.01) |
| *B29C 65/48* | (2006.01) |
| *D04C 1/06* | (2006.01) |
| *B29L 31/00* | (2006.01) |
| *B66B 9/00* | (2006.01) |

(52) U.S. Cl.
CPC .............. *B66B 7/062* (2013.01); *B29C 65/48* (2013.01); *D04C 1/06* (2013.01); *D07B 5/045* (2021.01); *B29L 2031/7092* (2013.01); *B66B 9/00* (2013.01)

(58) Field of Classification Search
None
See application file for complete search history.

(56) References Cited

U.S. PATENT DOCUMENTS

| | | | |
|---|---|---|---|
| 1,475,250 A | * | 11/1923 | Sundh .................... B66B 7/062 254/266 |
| 2,292,124 A | | 8/1942 | Hynes |
| 5,785,621 A | | 7/1998 | Birzele |

(Continued)

FOREIGN PATENT DOCUMENTS

| | | | |
|---|---|---|---|
| CN | 101278084 A | | 10/2008 |
| CN | 102002872 | * | 4/2011 |

(Continued)

OTHER PUBLICATIONS

Machine Translation of CN 102002872 (Year: 2011).*

(Continued)

*Primary Examiner* — Shawn Mckinnon
(74) *Attorney, Agent, or Firm* — Cantor Colburn LLP

(57) ABSTRACT

A belt for suspending and/or driving an elevator car includes a plurality of tension elements extending along a length of the belt and a plurality of belt fibers transverse to the plurality of tension elements and interlaced therewith. The belt fibers define at least one traction surface of the belt. An edge fiber is located at a lateral end of the belt transverse to and secured to the plurality of belt fibers to secure the belt fibers in a selected position.

9 Claims, 6 Drawing Sheets

(56) References Cited

U.S. PATENT DOCUMENTS

2009/0134690 A1  5/2009  Shimazaki et al.
2011/0192131 A1  8/2011  Naito et al.

FOREIGN PATENT DOCUMENTS

| | | |
|---|---|---|
| CN | 102216192 A | 10/2011 |
| EP | 0228725 A1 | 7/1987 |
| EP | 0250044 A1 | 12/1987 |
| JP | 05116506 A | 5/1993 |
| JP | 2009068150 A | 4/2009 |
| WO | 2013105958 A1 | 7/2013 |

OTHER PUBLICATIONS

Chinese Office Action Issued In CN Application No. 201480075813.5, dated Apr. 20, 2018, 7 Pages.
European Search Report Issued In EP Application No. 14882976.5, dated Oct. 13, 2017, 9 Pages.
Notification of Transmittal of the International Search Report and the Written Opinion of the International Searching Authority, or the Declaration; Application No. PCT/US2014016864; dated Nov. 13, 2014; 12 pages.

* cited by examiner

ELEVATOR BELT AND METHOD OF MANUFACTURE

CROSS-REFERENCE TO RELATED APPLICATIONS

This application is a divisional application of U.S. patent application Ser. No. 15/119,402 filed on Aug. 17, 2016, and further claims priority to PCT Patent Application No. PCT/US2014/016864 filed on Feb. 18, 2014, the disclosures of which are incorporated herein by reference in their entirety.

BACKGROUND

The subject matter disclosed herein relates to tension members such as those used in elevator systems for suspension and/or driving of the elevator car and/or counterweight.

Conventional elevator systems use rope formed from steel wires as a lifting tension load bearing member. Other systems utilize a lifting belt formed from a number of steel cords, formed from steel wires, retained in an elastomeric jacket. The cords act as the load supporting tension member, while the elastomeric jacket holds the cords in a stable position relative to each other, and provides a frictional load path to provide traction for driving the belt.

Still other systems utilize woven belts, in which yarns or other non-metallic fibers are woven together with the steel cords to retain the cords. The woven belt is also saturated or coated with an elastomeric binder. This is done to produce a selected amount of traction between the belt and a traction sheave that drives the belt, while reducing noise that sometimes results from the use of elastomeric belts. The steel cords in the woven belt are the primary load bearing tension members, the yarns and the binder material act to keep the cords in place and provide a traction surface. The use of yarn materials also expands the physical properties of the construction beyond what is possible from thermoplastic or extrudable rubber jacket materials. These properties include, but are not limited to, tensile strength, friction properties and flammability. In the woven belts, the yarns are oriented at angular orientations of 0 degrees and 90 degrees relative to the steel cords, and the belt is assembled by a weaving process on a loom. The weaving process is inefficient and time consuming.

BRIEF DESCRIPTION

In one embodiment, a belt for suspending and/or driving an elevator car includes a plurality of tension elements extending along a length of the belt and a plurality of belt fibers transverse to the plurality of tension elements and interlaced therewith. The belt fibers define at least one traction surface of the belt. An edge fiber is located at a lateral end of the belt and is secured to the plurality of belt fibers to secure the belt fibers in a selected position.

Alternatively or additionally, in this or other embodiments, the edge fiber includes adhesive to secure the edge fiber to the plurality of belt fibers.

Alternatively or additionally, in this or other embodiments, the edge fiber includes a thermally-activated material to secure the edge fiber to the plurality of belt fibers.

Alternatively or additionally, in this or other embodiments, the edge fiber extends parallel to the plurality of tension elements.

Alternatively or additionally, in this or other embodiments, the plurality of belt fibers is transverse to the plurality of tension elements at a non-perpendicular angle.

Alternatively or additionally, in this or other embodiments, the angle is forty-five degrees.

Alternatively or additionally, in this or other embodiments, the tension elements are formed from a first material and the belt fibers are formed from a second, different material.

Alternatively or additionally, in this or other embodiments, the tension elements are formed from a metallic material and the belt fibers are formed from a non-metallic material.

Alternatively or additionally, in this or other embodiments, the belt fibers comprise a thermoplastic material.

Alternatively or additionally, in this or other embodiments, the belt fibers include thermoplastic filaments.

Alternatively or additionally, in this or other embodiments, the belt fibers are at least partially coated with an elastomeric material.

In another embodiment, a method of forming a belt for suspending and/or driving an elevator car includes arranging a plurality of tension elements along a length of the belt, defining a length of the belt and braiding a plurality of belt fibers together with the plurality of tension elements to form a braided structure. The plurality of belt fibers extends transverse to the plurality of tension elements. An edge fiber is braided into the plurality of belt fibers at a lateral side of the braided structure, and the edge fiber is secured to the plurality of belt fibers to retain the weave fibers in a selected position.

Alternatively or additionally, in this or other embodiments, the edge fiber is heated to secure the edge fiber to the plurality of belt fibers.

Alternatively or additionally, in this or other embodiments, an edge fiber is braided into the plurality of belt fibers at each lateral side of the braided structure.

Alternatively or additionally, in this or other embodiments, the edge fiber extends parallel to the plurality of tension elements.

Alternatively or additionally, in this or other embodiments, the plurality of belt fibers is transverse to the plurality of tension elements at a non-perpendicular angle.

Alternatively or additionally, in this or other embodiments, the angle is forty-five degrees.

Alternatively or additionally, in this or other embodiments, a band of selvage fibers are braided into the braided structure between adjacent tension elements of the plurality of tension elements.

Alternatively or additionally, in this or other embodiments, the selvage fibers are secured to the plurality of belt fibers.

Alternatively or additionally, in this or other embodiments, the braided structure is separated into two braided structures at the band of selvage fibers.

The detailed description explains the invention, together with advantages and features, by way of examples with reference to the drawings.

DETAILED DESCRIPTION

Figure 1A:
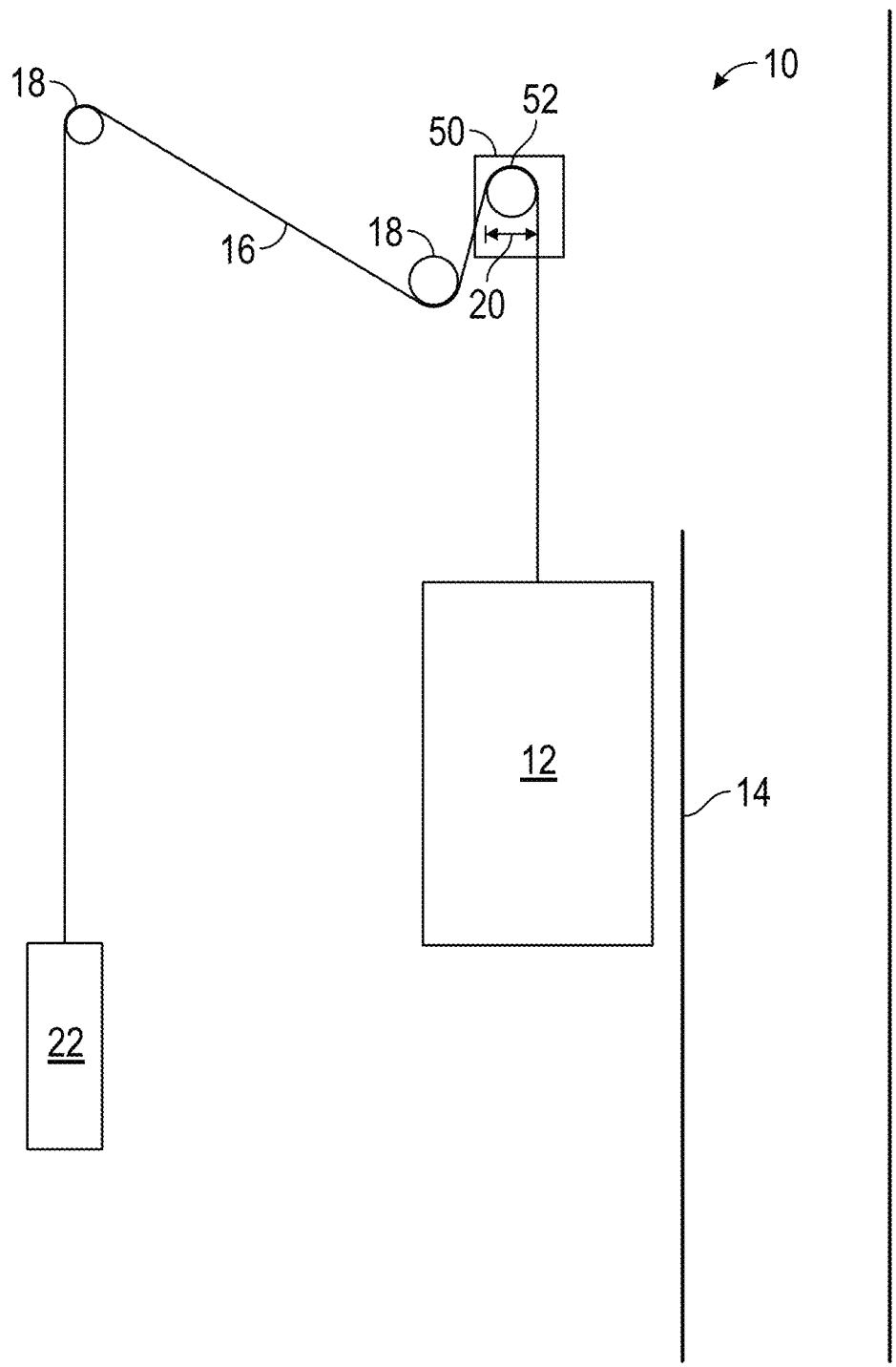
FIG. 1A is a schematic of an exemplary elevator system having a 1:1 roping arrangement.
Figure 1B:
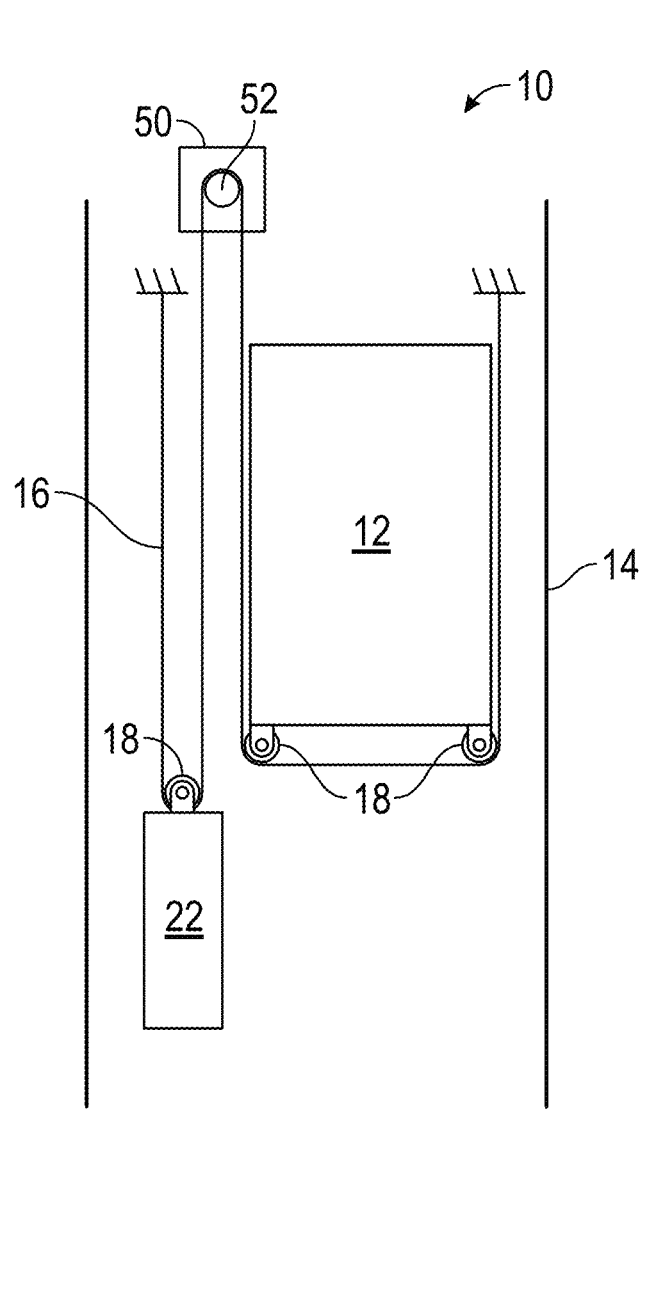
FIG. 1B is a schematic of another exemplary elevator system having a different roping arrangement.
Figure 1C:
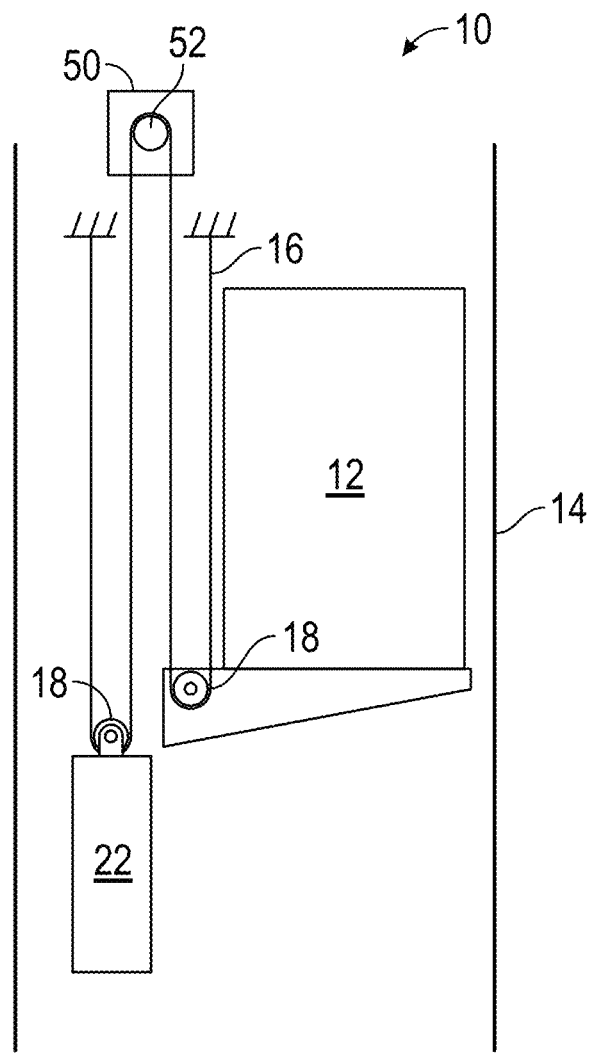
FIG. 1C is a schematic of another exemplary elevator system having a cantilevered arrangement.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a traction sheave 52. The traction sheave 52 is driven by a machine 50. Movement of drive sheave by the machine 50 drives, moves and/or propels (through traction) the one or more belts 16 that are routed around the traction sheave 52.

At least one of the sheaves 18 could be a diverter, deflector or idler sheave. Diverter, deflector or idler sheaves are not driven by a machine 50, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 (such as shown in the exemplary elevator systems in FIG. 1A, 1B or 1C) or only one side of the one or more belts 16 engages the one or more sheaves 18.

FIG. 1A provides a 1:1 roping arrangement in which the one or more belts 16 terminate at the car 12 and counterweight 22. FIGS. 1B and 1C provide different roping arrangements. Specifically, FIGS. 1B and 1C show that the car 12 and/or the counterweight 22 can have one or more sheaves 18 thereon engaging the one or more belts 16 and the one or more belts 16 can terminate elsewhere, typically at a structure within the hoistway 14 (such as for a machineroomless elevator system) or within the machine room (for elevator systems utilizing a machine room. The number of sheaves 18 used in the arrangement determines the specific roping ratio (e.g. the 2:1 roping ratio shown in FIGS. 1B and 1C or a different ratio). FIG. 1C also provides a so-called rucksack or cantilevered type elevator. The present invention could also be used on elevator systems other than the exemplary types shown in FIGS. 1A, 1B and 1C.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 3:
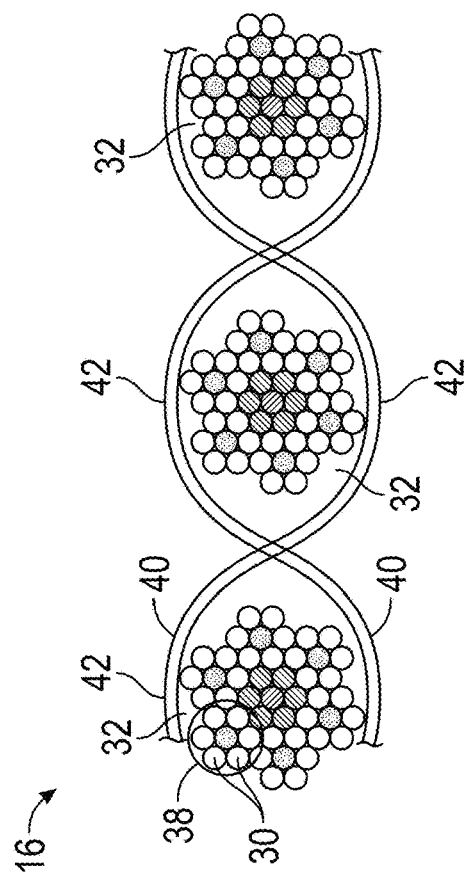
FIG. 3 is a cross-sectional view of an embodiment of an elevator belt.
Figure 2:
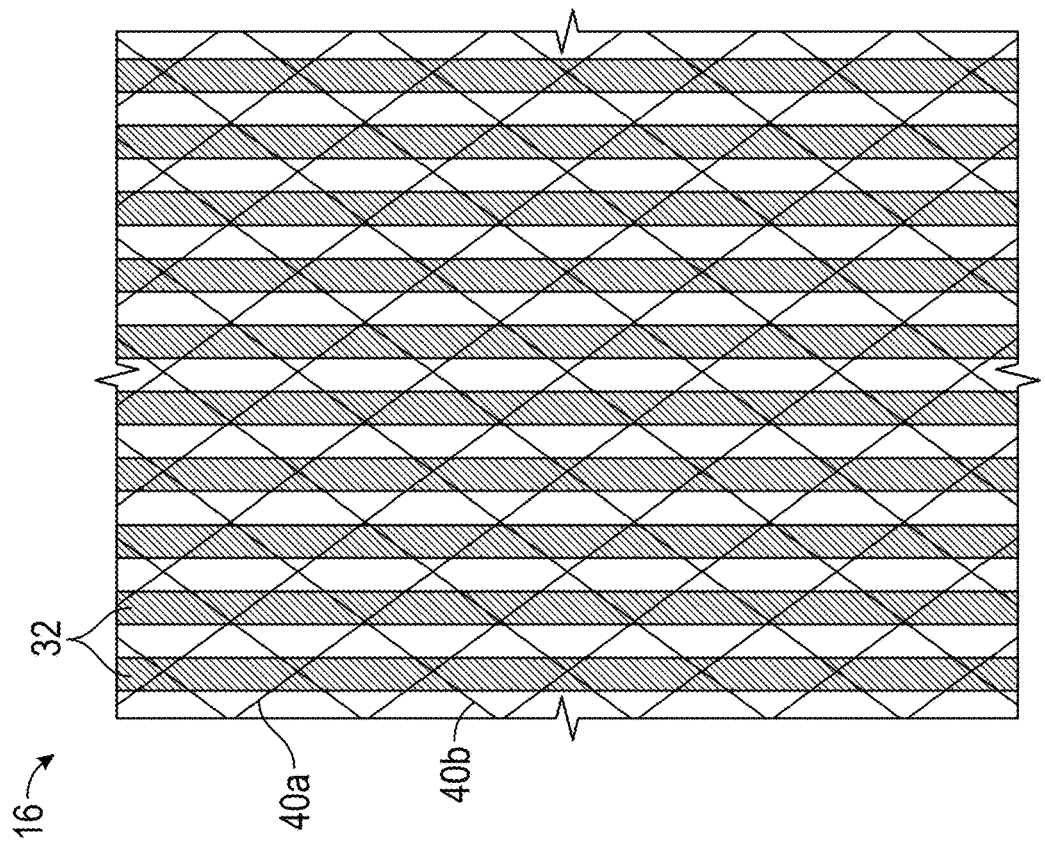
FIG. 2 is a plane view of an embodiment of an elevator belt.

FIG. 2 provides a schematic of an exemplary belt 16 construction or design. The belt 16 includes a plurality of tension elements 32. As shown in FIG. 3, in some embodiments, the tension elements are cords formed from a plurality of steel wires 36, which may be arranged into strands 38. Referring again to FIG. 2, the tension elements 32 are arranged generally parallel to each other and extend in a longitudinal direction that establishes a length of the belt 16. A plurality of belt fibers 40 that are braided together with the tension elements 32 into a fabric that substantially retains the tension elements 32 has a selected orientation relative to each other. The phrase "substantially retains" means that belt fibers 40 sufficiently engage the tension elements 32 such that the tension elements 32 to not pull out of, or move relative to, the belt fibers 40 in use of the belt 16.

Referring again to FIG. 3, the belt 16 includes a traction surface 42 on at least one side of the belt 16, and is defined by the belt fibers 40. Having the traction surface 42 defined by the belt fibers 40 includes the belt fibers 40 being exposed at the traction surface 42, a coating over the belt fibers 40 having a surface contour defined by the presence of the belt fibers 40, or a combination of these.

The tension elements 32 are the primary load bearing structure of the elevator belt 16. In some embodiments, the belt fibers 40 do not support the weight of the elevator car 12 or counterweight 22. Nevertheless, the belt fibers 40 do form part of the load path. The belt fibers 40 transmit the traction forces between the traction sheave 52 and the belt 16 to the tension elements 32. Such traction force transmission in some examples is direct (e.g. when the belt fibers 40 are exposed at the traction surface 42) or indirect (e.g. when the belt fibers 40 are coated and the coating establishes the exterior of the traction surface 42).

The belt fibers 40 are arranged in a pattern relative to the tension elements 32 so that a spacing between the traction surface 42 and the tension elements 32 prevents the tension elements 32 from contacting a component that the traction surface 42 engages. For example, the tension elements 32 will not contact a surface on the traction sheave 52 as the belt 16 wraps at least partially around the traction sheave 52. The size of the belt fibers 40, the material of the belt fibers 40, the pattern of the belt fibers 40 or a combination of these is selected to ensure the desired spacing between the tension elements 32 and the traction surface 42 so that the tension elements 32 are protected from direct engagement with a component such as the traction sheave 52. In one embodiment, a coating over the belt fibers 40 protects the weave fibers 40 and therefore ensures that the tension elements 32 are sufficiently spaced from the traction surface 42 so that the tension elements 32 will not directly engage or come into contact with the traction sheave 52 or another sheave 18 of the elevator system.

In an embodiment, the tension elements 32 are formed from a first material, such as drawn steel, and the belt fibers 40 are formed from a second, different material and have a much smaller thickness and/or cross-sectional dimension compared to the tension elements 32. The belt fibers 40 may be formed from, for example, a nonmetallic material such as a polymer. In some embodiment, the belt fibers 40 include a thermoplastic material that is useful for establishing the traction surface 42. One embodiment includes forming the belt fibers 40, then coating the belt fibers 40 with the elastomeric material. In another embodiment, the belt fibers 40 are formed, braided to the tension elements 32, then selectively coated with the elastomeric material. In still another embodiment, the belt fibers 40 are formed from a plurality of filaments, with at least one of the filaments including the thermoplastic material.

The belt fibers 40 are oriented at a non-perpendicular angle to the tension elements 32, for example, at +/−60 degrees or +/−45 degrees relative to the tension elements. Further, the belt fibers 40 may include first belt fibers 40a orientated at a first angle relative to the tension elements 32 and second belt fibers 40b oriented at a second angle relative to the tension elements 32. Braiding with the belt fibers 40 oriented at angles other than 0 and 90 degrees relative to the tension elements 32 provides a tightening effect when as the belt 16 is formed, as well as when the belt 16 is initially put into service and a load is applied to it. The tightening improves dimensional stability of the belt 16 as well as greater control over traction of the belt 16 during operation. Thermoplastic, elastomeric, adhesive and/or thermally-activated materials may be included in the belt 16 to improve dimensional and physical properties of the belt 16.

Figure 4:
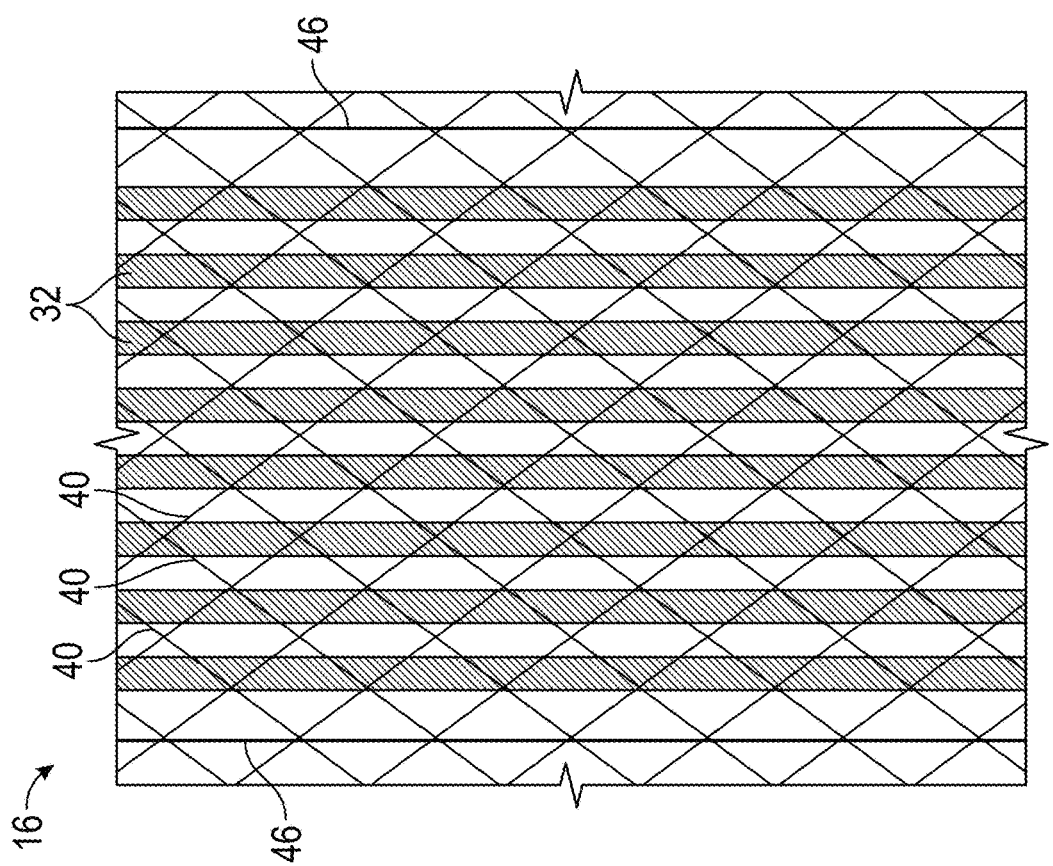
FIG. 4 is a plane view of another embodiment of an elevator belt.

Referring now to FIG. 4, in addition to the belt fibers 40 and the tension elements 32, the belt 16 includes edge fibers 46 extending along the length of the belt 16 substantially parallel to the tension elements 32. The edge fibers 46 may be formed from an adhesive or thermally-activated material, which when set, secures the positions of the belt fibers 40, preventing the belt 16 from fraying or unraveling at the edges. In some embodiments, the edge fibers 46 may be mechanically closed around the belt fibers 40 by, for example, tying, to secure the edge fiber 46 and belt fiber 40 position.

Figure 5:
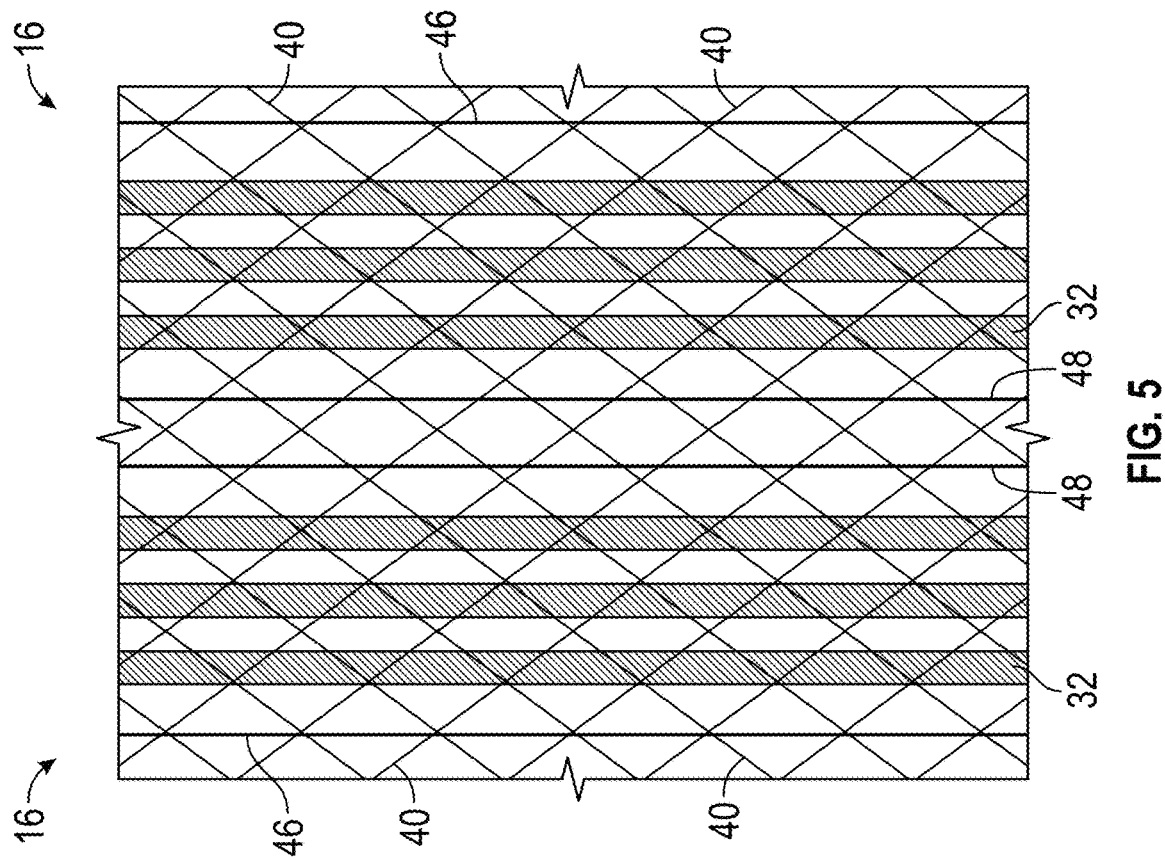
FIG. 5 is a plane view of yet another embodiment of an elevator belt.
Figure 6:
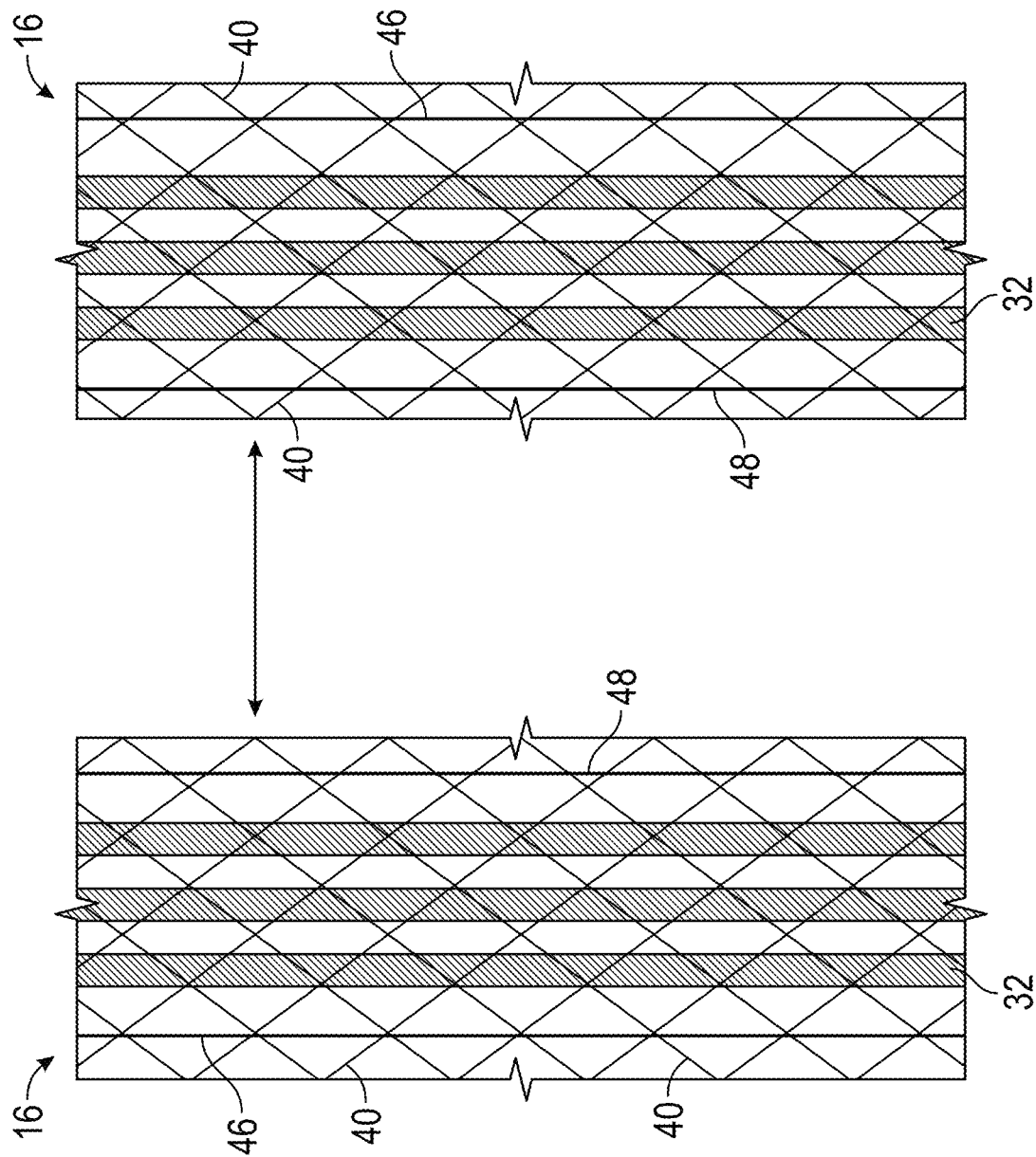
FIG. 6 is a plane view of still another embodiment of an elevator belt.

Referring now to FIGS. 5 and 6, the braiding arrangement of the belt fibers 40 allows for the simultaneous manufacturing of multiple belts 16. Tension elements 32 for two or more belts 16 are arranged side-by-side, along with edge fibers 46 at the edges, and a band of selvage fibers 48, or alternatively, additional edge fibers 46 between adjacent tension elements 32. The belt fibers 40a and 40b are braided through the edge fibers 46, tension elements 32 and selvage fibers 48 defining a single braided structure. The edge fibers 46 and selvage fibers 48, if needed, are activated by, for example, application of heat, to secure the belt fibers 40a and 40b in place. Finally, the braided structure is separated into two or more belts 16, as shown in FIG. 6, by cutting or otherwise separating the structure between the selvage fibers 48. Manufacturing of more than one belt 16 at a time utilizing this method increases efficiency of fabrication and reduces material waste in fabrication. While the embodiment illustrated produces two belts 16 simultaneously, one skilled in the art will recognize that such method may be used to fabricate 3, 4 or more belts 16 simultaneously.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of forming a belt for suspending and/or driving an elevator car, comprising:
   arranging a plurality of metallic tension elements along a length of the belt, defining a length of the belt;
   braiding a plurality of non-metallic belt fibers together with the plurality of tension elements to form a braided structure, the plurality of belt fibers extending transverse to the plurality of tension elements;
   braiding one or more non-metallic edge fibers into the plurality of belt fibers at a lateral side of the braided structure; and
   securing the one or more edge fibers to the plurality of belt fibers to retain the belt fibers in a selected position;
   wherein the one or more edge fibers include a thermally-activated material, which when set secures the one or more edge fibers to the plurality of belt fibers, the one or more edge fibers disposed parallel to the plurality of tension elements, the one or more non-metallic edge fibers mechanically closed around the plurality of belt fibers.

2. The method of claim 1, further comprising heating the one or more edge fibers to secure the edge fiber to the plurality of belt fibers.

3. The method of claim 1, further comprising braiding one or more edge fibers into the plurality of belt fibers at each lateral side of the braided structure.

4. The method of claim 1, wherein the one or more edge fibers extend parallel to the plurality of tension elements.

5. The method of claim 1, wherein the plurality of belt fibers are transverse to the plurality of tension elements at a non-perpendicular angle.

6. The method of claim 5, wherein the angle is forty-five degrees.

7. The method of claim 1, A method of forming a belt for suspending and/or driving an elevator car, comprising:
   arranging a plurality of tension elements along a length of the belt, defining a length of the belt;
   braiding a plurality of belt fibers together with the plurality of tension elements to form a braided structure, the plurality of belt fibers extending transverse to the plurality of tension elements;
   braiding one or more edge fibers into the plurality of belt fibers at a lateral side of the braided structure; and
   securing the one or more edge fibers to the plurality of belt fibers to retain the belt fibers in a selected position; and
   braiding a band of selvage fibers into the braided structure between adjacent tension elements of the plurality of tension elements.

8. The method of claim 7, further comprising securing each selvage fiber band to the plurality of belt fibers.

9. The method of claim 8, further comprising separating the braided structure into two or more braided structures at the selvage fiber bands.

* * * * *